United States Patent
Liu et al.

(10) Patent No.: US 12,375,884 B2
(45) Date of Patent: Jul. 29, 2025

(54) TRACKING REFERENCE SIGNAL FOR MULTICAST AND BROADCAST SYSTEMS

(71) Applicant: QUALCOMM Incorporated, San Diego, CA (US)

(72) Inventors: Le Liu, San Jose, CA (US); Alberto Rico Alvarino, San Diego, CA (US); Kazuki Takeda, Tokyo (JP); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 17/645,169

(22) Filed: Dec. 20, 2021

(65) Prior Publication Data

US 2023/0096800 A1   Mar. 30, 2023

Related U.S. Application Data

(60) Provisional application No. 63/261,896, filed on Sep. 30, 2021.

(51) Int. Cl.
| | |
|---|---|
| *H04W 4/06* | (2009.01) |
| *H04L 5/00* | (2006.01) |
| *H04W 72/0453* | (2023.01) |
| *H04W 72/23* | (2023.01) |

(52) U.S. Cl.
CPC .............. *H04W 4/06* (2013.01); *H04L 5/0051* (2013.01); *H04W 72/0453* (2013.01); *H04W 72/23* (2023.01)

(58) Field of Classification Search
CPC ... H04W 4/06; H04W 72/0453; H04W 72/23; H04W 72/30; H04L 5/0051; Y02D 30/70
See application file for complete search history.

(56) References Cited

U.S. PATENT DOCUMENTS

| | | | |
|---|---|---|---|
| 2022/0231818 A1* | 7/2022 | Lee | H04L 5/0098 |
| 2023/0247633 A1* | 8/2023 | Liu | H04L 27/2605 370/329 |
| 2023/0412341 A1* | 12/2023 | Jung | H04W 68/02 |
| 2023/0413091 A1* | 12/2023 | Babaei | H04W 4/06 |
| 2024/0015769 A1* | 1/2024 | Lei | H04L 1/1822 |
| 2024/0080152 A1* | 3/2024 | Shrivastava | H04W 52/0235 |

(Continued)

FOREIGN PATENT DOCUMENTS

| | | | | |
|---|---|---|---|---|
| EP | 2830237 B1 * | 2/2018 | | H04L 1/0046 |
| EP | 4429156 A1 * | 9/2024 | | H04L 5/00 |

OTHER PUBLICATIONS

Moderator (BBC), 3GPP TSG RAN WG1 #106-e, Feature lead summary #1 on RAN basic functions for broadcast/multicast for UEs in RRC_Idle/ RRC_Inactive states, R1-2108227 (Year: 2021).*

(Continued)

*Primary Examiner* — Ayaz R Sheikh
*Assistant Examiner* — Mang Boi Thawng
(74) *Attorney, Agent, or Firm* — Harrity & Harrity, LLP

(57) ABSTRACT

Various aspects of the present disclosure generally relate to wireless communication. In some aspects, a user equipment (UE) may receive, in an idle or inactive state and in a common frequency resource (CFR) used for multicast and broadcast services (MBS), a tracking reference signal (TRS) configuration for MBS. The UE may receive a TRS according to the TRS configuration. Numerous other aspects are described.

30 Claims, 8 Drawing Sheets

(56) References Cited

U.S. PATENT DOCUMENTS

2024/0297706 A1* 9/2024 Matsumura ............. H04W 4/06
2025/0030468 A1* 1/2025 Lee ...................... H04B 7/0695

OTHER PUBLICATIONS

Futurewei, 3GPP TSG RAN WG1 #106-e, MBS Support for RRC Idle/Inactive UEs, R1-2107095 (Year: 2021).*
Moderator (Samsung), 3GPP TSG RAN WG1 #104b-e, Summary for TRS/CSI-RS occasion(s) for idle/inactive UEs, R1-2103251 (Year: 2021).*
Sony, 3GPP TSG RAN WG1 #104bis-e, Discussion On TRS/CSI-RS occasion(s) for idle/inactive UEs, R1-2103311 (Year: 2021).*
Moderator (Samsung), Summary for TRS/CSI-RS occasion(s) for idle/inactive UEs, 3GPP TSG RAN WG1 #104b-e, R1-2103251 (Year: 2021).*
Sony, Discussion On TRS/CSI-RS occasion(s) for idle/inactive UEs, 3GPP TSG RAN WG1 #104bis-e, R1-2103311 (Year: 2021).*
Huawei, HiSilicon, Multicast session reception in RRC Inactive, 3GPP TSG-RAN WG2 Meeting #113bis-e, R2-2103907 (Year: 2021).*
Moderator (BBC), Feature lead summary #1 on RAN basic functions for broadcast/multicast for UEs in RRC_Idle/ RRC_Inactive states, 3GPP TSG RAN WG1 #106-e, R1-2108227 (Year: 2021).*
ETRI, "Common frequency resource configuration for multicast of RRC_Connected UEs", 3GPP TSG RAN WG1 Meeting #106-e, R1-2106996 (Year: 2021).*

International Search Report and Written Opinion—PCT/US2022/076794—ISA/EPO—Jan. 3, 2023.
Moderator (BBC): "Feature Lead Summary #1 on RAN Basic Functions for Broadcast/multicast for UEs in RRC_Idle/RRC_Inactive States", 3GPP TSG RAN WG1 #106-e, R1-2108227, 3rd GenerationPartnership Project (3GPP), Mobile Competence Centre, 650, Route Des Lucioles, F-06921 Sophia-Antipolis Cedex, France, Aug. 16, 2021-Aug. 27, 2021, Aug. 19, 2021, pp. 1-89, XP052042066, The Whole Document.
Moderator (BBC): "Feature Lead Summary #1on RAN Basic Functions for Broadcast/multicast for UEs in RRC_Idle/RRC_Inactive States", 3GPP TSG RAN WG1 #105-e, R1-2105993, 3rd GenerationPartnership Project (3GPP), Mobile Competence Centre, 650, Route Des Lucioles, F-06921 Sophia-Antipolis Cedex, France, May 10, 2021-May 27, 2021, May 19, 2021, pp. 1-41, XP052012448, The Whole Document.
Qualcomm Incorporated: "Discussion on Broadcast/Multicast for RRC_Idle and RRC_Inactive UEs", 3GPP TSG RAN WG1 #104, R1-2101489, 3rd Generation Partnership Project (3GPP), Mobile Competence Centre, 650, Route Des Lucioles, F-06921 Sophia-Antipolis Cedex, France, Jan. 25, 2021-Feb. 5, 2021, 8 Pages, Jan. 19, 2021, XP051971654, Title, Section 1, 7.
Qualcomm Incorporated: "Views on Group Scheduling for Broadcast RRC_Idle/Inactive UEs", 3GPP TSG RAN WG1 #106-e, R1-2107371, 3rd Generation Partnership Project (3GPP), Mobile Competence Centre, 650, Route Des Lucioles, F-06921 Sophia-Antipolis Cedex, France, Aug. 16, 2021-Aug. 27, 2021, Aug. 6, 2021, XP052038316, 9 Pages, Title, Section 2.4.

* cited by examiner

TRACKING REFERENCE SIGNAL FOR MULTICAST AND BROADCAST SYSTEMS

CROSS-REFERENCE TO RELATED APPLICATION

This patent application claims priority to U.S. Provisional Patent Application No. 63/261,896, filed on Sep. 30, 2021, entitled "TRACKING REFERENCE SIGNAL FOR MULTICAST AND BROADCAST SYSTEMS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuring a tracking reference signal for multicast and broadcast systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, in an idle or inactive state and in a common frequency resource (CFR) used for multicast and broadcast services (MBS), a tracking reference signal (TRS) configuration for MBS. The method may include receiving a TRS according to the TRS configuration.

Some aspects described herein relate to a method of wireless communication performed by a base station. The method may include transmitting a TRS configuration for MBS in a CFR used for MBS. The method may include transmitting a TRS according to the TRS configuration.

Some aspects described herein relate to a UE for wireless communication. The user equipment may include a memory and one or more processors coupled to the memory. The one or more processors may be configured to receive, in an idle or inactive state and in a CFR used for MBS, a TRS configuration for MBS. The one or more processors may be configured to receive a TRS according to the TRS configuration.

Some aspects described herein relate to a base station for wireless communication. The base station may include a memory and one or more processors coupled to the memory. The one or more processors may be configured to transmit a TRS configuration for MBS in a CFR used for MBS. The one or more processors may be configured to transmit a TRS according to the TRS configuration.

Some aspects described herein relate to a non-transitory computer-readable medium that stores a set of instructions for wireless communication by a UE. The set of instructions, when executed by one or more processors of the UE, may cause the UE to receive, in an idle or inactive state and in a CFR used for MBS, a TRS configuration for MBS. The set of instructions, when executed by one or more processors of the UE, may cause the UE to receive a TRS according to the TRS configuration.

Some aspects described herein relate to a non-transitory computer-readable medium that stores a set of instructions for wireless communication by a base station. The set of instructions, when executed by one or more processors of the base station, may cause the base station to transmit a TRS configuration for MBS in a CFR used for MBS. The set of instructions, when executed by one or more processors of the base station, may cause the base station to transmit a TRS according to the TRS configuration.

Some aspects described herein relate to an apparatus for wireless communication. The apparatus may include means for receiving, in an idle or inactive state and in a CFR used for MBS, a TRS configuration for MBS. The apparatus may include means for receiving a TRS according to the TRS configuration.

Some aspects described herein relate to an apparatus for wireless communication. The apparatus may include means for transmitting a TRS configuration for MBS in a CFR used for MBS. The apparatus may include means for transmitting a TRS according to the TRS configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
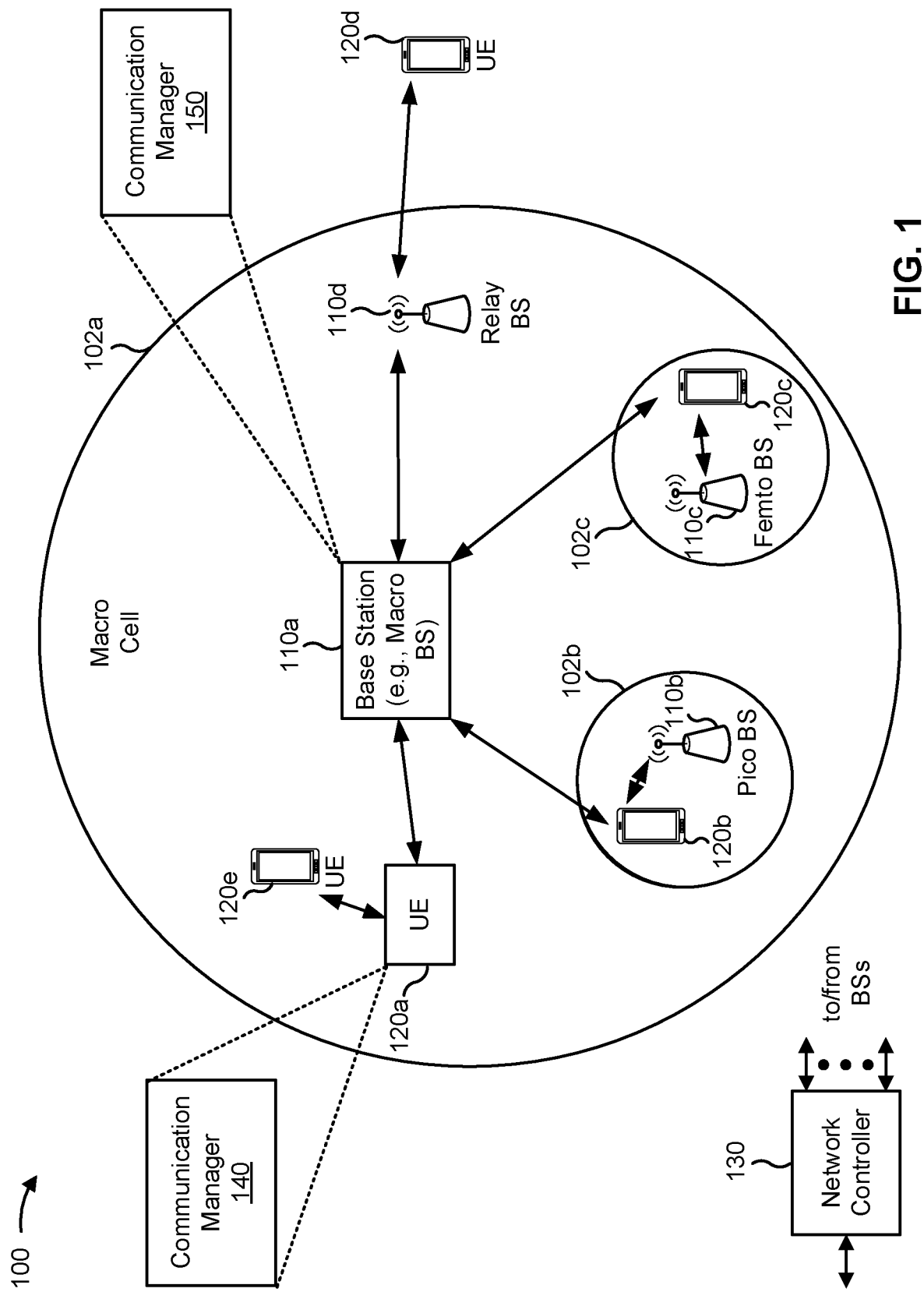
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, in an idle or inactive state and in a common frequency resource (CFR) used for multicast and broadcast services (MBS), a tracking reference signal (TRS) configuration for MBS. The communication manager 140 may receive a TRS according to the TRS configuration. Additionally, or alternatively, the communication manager 140 may perform one or more other operations described herein.

In some aspects, the base station 110 may include a communication manager 150. As described in more detail elsewhere herein, the communication manager 150 may transmit a TRS configuration for MBS in a CFR used for MBS. The communication manager 150 may transmit a TRS according to the TRS configuration. Additionally, or alternatively, the communication manager 150 may perform one or more other operations described herein.

As indicated above, FIG. 1 is provided as an example. Other examples may differ from what is described with regard to FIG. 1.

Figure 2:
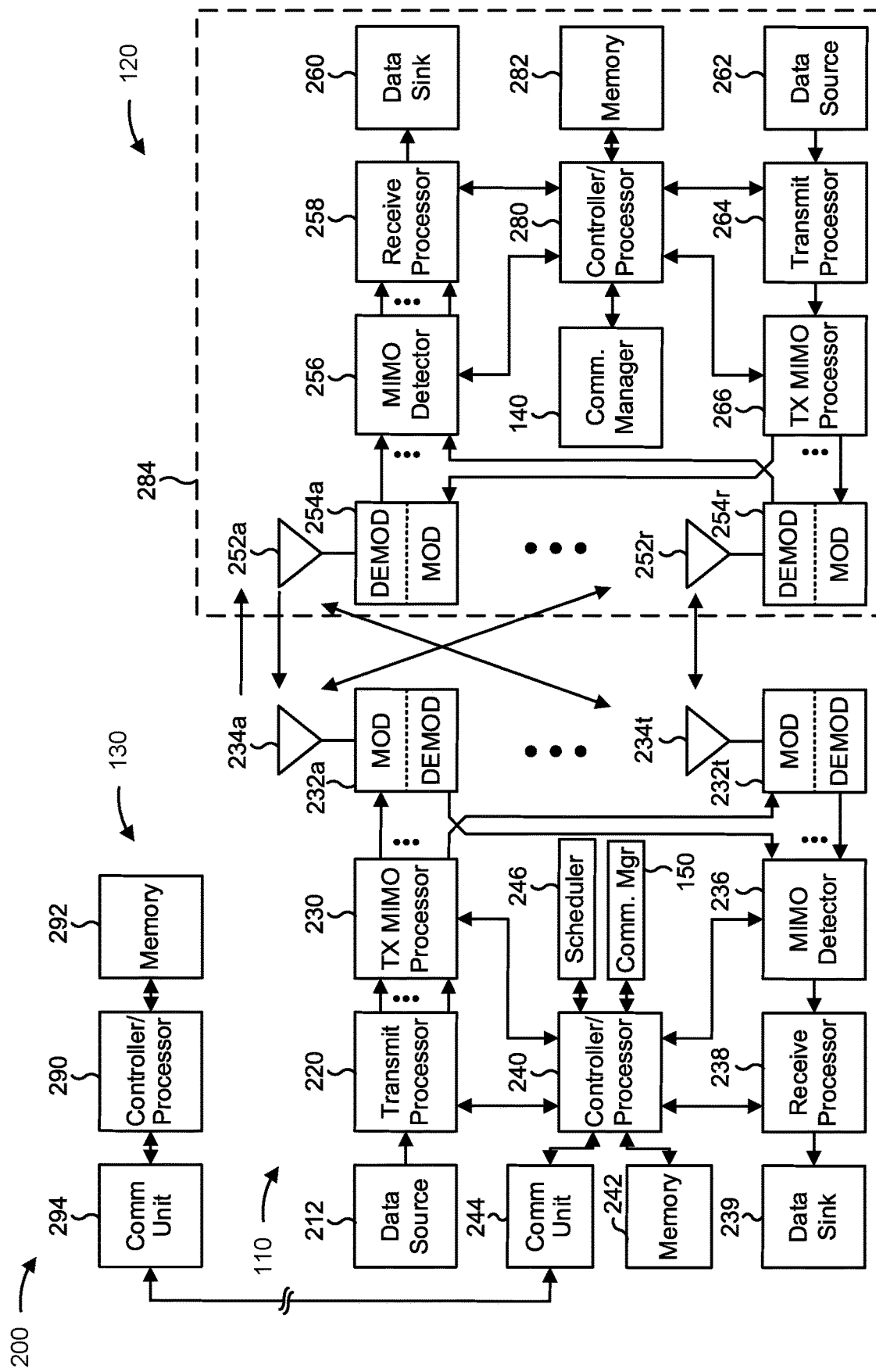
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with a TRS for MBS, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving, in an idle or inactive state and in a CFR used for MBS, a TRS configuration for MBS; and/or means for receiving a TRS according to the TRS configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a TRS configuration for MBS in a CFR used for MBS, and/or means for transmitting a TRS according to the TRS configuration. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
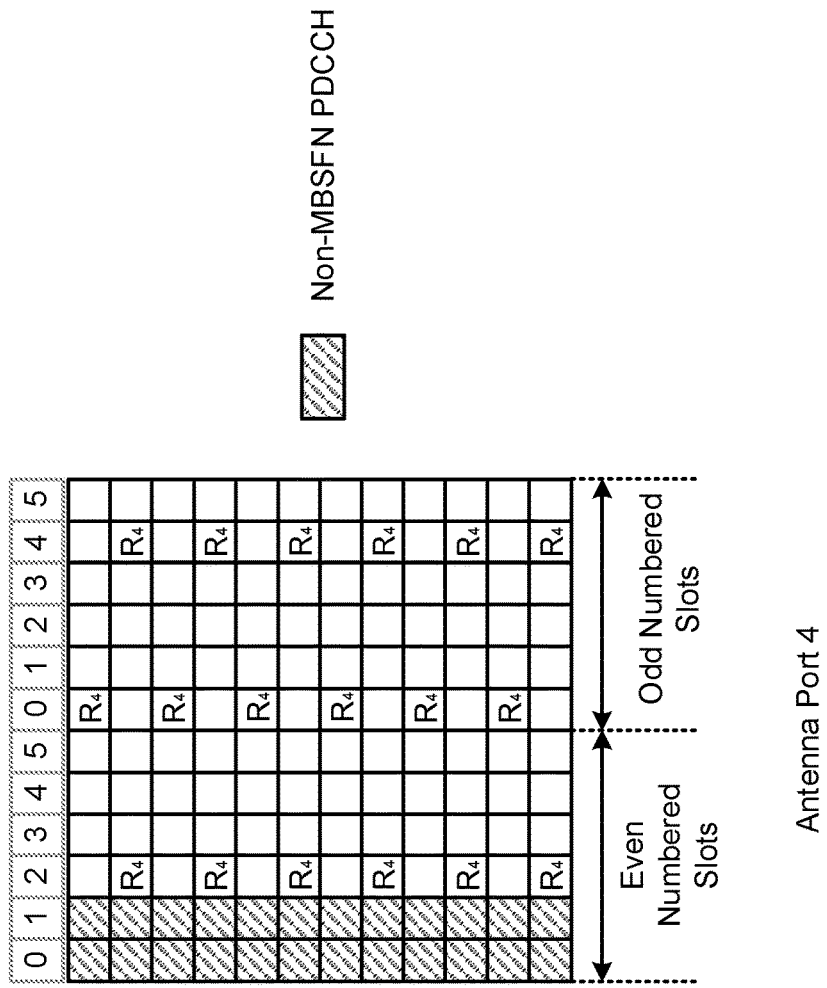
FIG. 3 is a diagram illustrating an example of a multicast and broadcast system (MBS) single frequency network (MBSFN) subframe, in accordance with the present disclosure.

FIG. 3 is a diagram illustrating an example 300 of an MBS single frequency network (MBSFN) subframe, in accordance with the present disclosure.

Downlink channels and downlink reference signals may carry information from a base station 110 to a UE 120, and uplink channels and uplink reference signals may carry information from a UE 120 to a base station 110. A downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. An uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

A downlink reference signal may include a synchronization signal block (SSB), a channel state information (CSI) reference signal (CSI-RS), a demodulation reference signal (DMRS), a positioning reference signal (PRS), a phase tracking reference signal (PTRS), or a TRS, among other examples. An uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

Base stations in some cells may form a first MBSFN area, and base stations in other cells may form a second MBSFN area. Different MBSFN areas may have different carrier frequencies. If two nearby or adjacent MBSFN areas have the same carrier frequency, the MBSFN subframes or radio frames for the cells in the two MBSFN areas may be time division multiplexed. The time division multiplexing of subframes or radio frames for MBSFN transmissions may help to avoid interference between different MBSFN areas. Each base station in an MBSFN area synchronously may transmit the same control information and/or data (e.g., for an MBSFN service provided thereby).

Each MBSFN area may support broadcast, multicast, and unicast services. A unicast service is a service intended for a specific UE, such as a voice call. A multicast service is a service that may be received by a group of UEs within an MBSFN area, such as a subscription video service. A broadcast service is a service that may be received by all UEs within an MBSFN area, such as a news broadcast. The first MBSFN area may support a first multicast service or a first broadcast service (for example, an evolved multicast service or an evolved broadcast service). The second MBSFN area may support a second multicast/broadcast service, such as by providing a different news broadcast to the UE.

Base stations may communicate using MBSFN subframes. The MBSFN subframes may include multicast control channels (MCCHs) and multicast traffic channels (MTCHs). In MBSFN subframes, symbols may be reserved for PDCCH (such as a non-MBSFN PDCCH). For example, the first one or two symbols of a given MBSFN subframe may be for PDCCH. The MBSFN subframes may also include MBSFN reference signals (MBSFN RS). The MBSFN RS may be denser than cell-specific reference signals. An MBSFN RS may be on antenna port 4, and a cell-specific reference signal may be on antenna ports 0-3. The MBSFN RS may be defined for wideband and extended cyclic prefix (ECP), and may not be defined for non-wideband or normal cyclic prefix (NCP) communications.

A TRS is a downlink signal that may be used to perform time synchronization or frequency synchronization with an MBSFN area, or to perform other tracking in order to receive communications in the MBSFN area. For example, a UE may use the TRS to update a tracking loop, which tracks changes to a frame timing of the network and an estimated time of arrival (TOA) of signals to be received by the UE. The UE may use the tracking loop updated by TRSs to perform operations quickly when transitioning from an idle or inactive state to a connected state.

The base station may utilize the TRS to communicate with the UE. The base station may transmit a radio resource control (RRC) message to a connected UE (e.g., a UE operating in an RRC state of RRC_CONNECTED). The RRC message may include configuration information for the TRS, or a TRS configuration. The UE may receive the RRC message and may store the TRS configuration. The UE may perform an action causing phase discontinuity, such as bandwidth part (BWP) switching, BWP activation, carrier aggregation, cell activation (e.g., secondary cell activation), multi-TRP switching, multi-panel switching, or beam changing, where the UE uses the TRS for fast synchronization and fine time/frequency tracking.

The UE may be configured to operate in one of at least three RRC states. For example, a UE may operate in an RRC_CONNECTED mode where the UE is connected to the wireless network (e.g., in both the control and user planes) through the base station. That is, a UE in an RRC_CONNECTED mode may have an access stratum (AS) context stored in the RAN, the UE may belong to a specific cell, the UE may communicate unicast data, and the RAN may control mobility of the UE. In an RRC INACTIVE mode, the UE may have an RRC context established with the base station or a core network connection established, but no data transfer is possible from the UE. The UE may still be able to receive paging initiated by the RAN and receive a broadcast of system information. In an RRC IDLE mode, where RRC context and base station or core network connections are not established, no data transfer is possible from the UE. The UE may still be able to receive a broadcast of system information.

A base station may transmit a TRS to the UE when the UE is in an idle or inactive state. The TRS configuration information received by the UE in the RRC message may indicate the resources on which the base station may transmit the TRS. In NR, there is no CRS. The TRS may be specifically configured for the UE for time/frequency tracking. For example, the TRS may be configured as a CSI-RS resource set with single-port non-zero power (NZP) CSI-RS. The TRS may be periodic, semi-persistent, or aperiodic.

Where the TRS is periodic, the TRS configuration information may identify the resources where the TRS will be periodically transmitted. Where the TRS is semi-persistent, the TRS may be activated and deactivated by a medium access control control element (MAC CE) and the TRS configuration information may identify the resources where the TRS will be transmitted when the TRS is activated, or may identify a resource position relative to the resources carrying the MAC CE where the TRS will be transmitted. Where the TRS is aperiodic, the TRS may be triggered by the DCI for an uplink grant. The triggering uplink grant may indicate one of a set of slot offset values, and the TRS configuration information may identify a set of slot offset values, where the slot offset is the number of slots between the slot transmitting the TRS and the slot carrying the uplink DCI. The UE may receive the TRS and may compare the resources on which the TRS is received to the expected resources to perform time and frequency synchronization and tracking.

In some scenarios, broadcast/multicast transmissions may occupy or have different multicast areas, and may employ different single frequency network (SFN) cell IDs, BWPs, quasi-co-location (QCL) beams and/or different uplink/downlink beams. The TRS may be employed in multicast systems to provide IDLE/INACTIVE UEs with BWP switching and/or activation. Some TRSs, such as a persistent TRS and/or a semi-persistent TRS, may be configured by system information blocks (SIBs) and/or MCCH communications, and a semi-persistent TRS may be activated by MAC-CE. A large periodicity may be used to reduce the overhead, which may be a multiple of the MCCH periodicity.

The TRS may include information that is associated with receiving the broadcast/multicast service that is based on an RRC state of the UE. For example, the information associated with the broadcast/multicast service may include a BWP on which the broadcast/multicast service is to be received by the UE when the UE is operating in an idle or inactive state. The information may include a BWP and/or a serving cell on which the broadcast/multicast service is to be received by the UE when the UE is operating in a connected state. The BWP and/or the serving cell may be configured to provide continuity of the broadcast/multicast service to be received by the UE when the UE is operating in the connected state. The base station may transmit the TRS in a multicast transmission to UEs that are in a connected state and moving, for BWP switching and/or cell switching or activation to maintain service continuity.

The TRS may be an aperiodic TRS that is triggered by a group downlink DCI for a BWP. A multicast data transmission may also be employed for faster tracking by the UE. An aperiodic TRS can be used for the MCCH, where a group downlink DCI with MCCH-radio network temporary identifier (RNTI) is employed. An aperiodic TRS can also be used for the MTCH, where a group downlink DCI with group RNTI (G-RNTI) may be employed for the MTCH with a higher MCS. The base station may also transmit an aperiodic TRS before an instantaneous multicast data transmission. The downlink DCI may indicate the TRS slot offset (including a zero offset) relative to the slot carrying the DCI.

The base station may transmit downlink DCI with a cell RNTI (C-RNTI) to trigger an aperiodic TRS at a target base station before the multicast transmission. The source base station may also be the base station transmitting multicast transmissions, and/or the source base station may be the serving cell for unicast retransmissions.

As indicated above, FIG. 3 is provided as an example. Other examples may differ from what is described with regard to FIG. 3.

Figure 4:
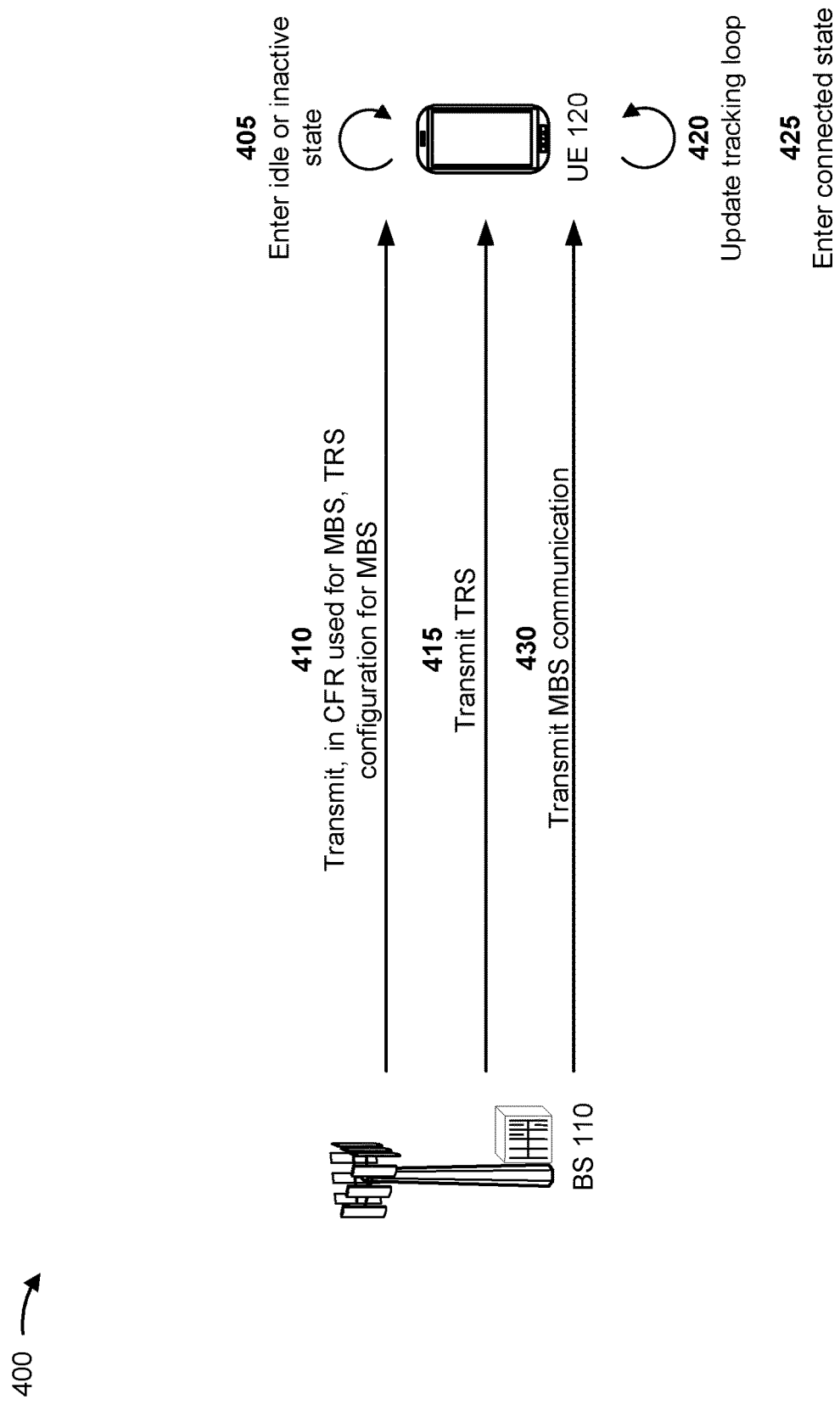
FIG. 4 is a diagram illustrating an example of transmitting a tracking reference signal (TRS) for MBS, in accordance with the present disclosure.

FIG. 4 is a diagram illustrating an example 400 of transmitting a TRS for MBS, in accordance with the present disclosure. As shown in FIG. 4, a base station 110 and a UE 120 may communicate with one another.

A TRS may be configured to help a UE save power. For example, a TRS may be configured for idle or inactive state tracking loop updates. However, rather than being used for power savings (and associated with CORESET0 in an initial BWP), the TRS may be configured for MBS with a TRS configuration that is provided within a CFR that is used for MBS. The CFR may be a frequency resource that is configured for MBS capable UEs (capable of receiving and responding to multicast or broadcast communications) rather than all idle or inactive UEs. Accordingly, a TRS for MBS and a TRS for power savings may have separate TRS configurations, which may be different TRS configurations with different values for bandwidth, numerology (subcarrier spacing (SCS) and cyclic prefix (CP) configuration), time occasions, QCL source, scrambling identifier (ID), or power offsets (power boosting), among other examples. That is, an MBS TRS configuration may be a TRS configuration that configures a TRS specifically for MBS for a UE in an idle or inactive state. A power saving TRS configuration may be a TRS configuration that configures a TRS specifically for power saving for a UE in an idle or inactive state. The power saving TRS configuration may configure power saving parameters (e.g., power offset for power saving) for the UEs (for a TRS for the UEs).

As shown by reference number 405, the UE 120 may enter an idle or inactive state. As shown by reference number 410, the base station 110 may transmit, in a CFR configured and used for MBS, a TRS configuration for MBS. In some aspects, the TRS for MBS may be separately configured for multicast and broadcast, where the TRS for MBS for multicast is different than the TRS for broadcast. The TRS for multicast may be configured for connected UEs only and the TRS configuration may be signaled by unicast RRC signaling. The TRS for broadcast may be configured for connected UEs and idle or inactive UEs, and the TRS configuration may be signaled in a SIB or an MCCH communication.

In some aspects, for multicast, the TRS may be separately configured for MCCH and MTCH, where the TRS for MCCH may be different than the TRS for MTCH. For example, a TRS configuration may configure, for an MCCH with a low modulation (e.g., quadrature phase shift keying (QPSK)), a TRS with a long periodicity, or there may be no TRS for the MCCH. The TRS configuration may configure, for an MTCH with a high modulation, a TRS with a short periodicity. In another example, an MCCH for single-cell transmission may be configured with a TRS using the same numerology (SCS and CP configuration) as the serving cell's CORESET0, but an MTCH using multi-cell SFN transmission may be configured with a TRS using a different numerology than the serving cell's CORESET0. The frequency range for the MTCH may be different than the power saving scenario. Also, if the TRS configuration for the MCCH is received in a SIB, the TRS for the MTCH may be configured by an MCCH message.

In some aspects, the TRS may be separately configured for a GC-PDCCH and a GC-PDSCH, where the TRS for the GC-PDCCH may be different than the TRS for the GC-PDSCH. For example, for the GC-PDCCH (low data rate, low payload, QPSK only), the TRS may use an existing numerology that is sufficient and the TRS may reuse the single-cell NCP transmission. The TRS may not be needed for the GC-PDCCH. However, for the GC-PDSCH, with a higher data rate, higher modulation, and multi-cell transmission, a separate TRS configuration may include a new numerology for the GC-PDSCH. For example, a GC-PDCCH using single-cell transmission can be configured with a TRS using the same numerology as the GC-PDCCH. A GC-PDSCH using multi-cell SFN transmission may be configured with a TRS that uses a different numerology than the GC-PDCCH scheduling the GC-PDSCH. In some aspects, there may be a common TRS configured for the MTCH, the MCCH, the GC-PDCCH, and the GC-PDSCH.

The TRS may be used for an enhanced SFN transmission (inter-data unit (DU)) SFN for broadcast, which may involve the TRS for idle or inactive UEs receiving a broadcast from multiple cells and not just the serving cell. This may enlarge the SFN area and involve a newer numerology with an ECP.

The TRS configuration for MBS may configure the TRS for SFN multi-cell reception, and a single cell SSB cannot be used for channel estimation of a multi-cell channel estimation. That is, the TRS may be configured for SFN multi-cell reception such that the TRS has a TRS configuration that is separate from (possibly different than) a TRS configuration for power saving scenarios.

In some aspects, the CFR may be associated with one or more G-RNTIs, and the parameters for the TRS may be configured per G-RNTI or per RNTI. For example, one TRS may correspond to one RNTI. The CFR may be associated with one or more numerologies (SCS and CP configurations), and the one or more parameters for the TRS may be a configured per numerology (per SCS and CP configuration).

In some aspects, new numerologies may be supported for TRS for MBS. The CORESET0 may have an SCS of 15 kHz or 30 kHz for FR1 and use an NCP. The TRS configuration for broadcast may include an SCS and CP configuration for broadcast that is different than an SCS and CP configuration for the CORESET0. For example, the TRS configuration may configure the TRS to use an SCS of 15 kHz but use an ECP (FR1). If the TRS is not configured, the UE may use, as a default TRS configuration, the same numerology as used for the CORESET0.

For unicast in a BWP, an SCS of 15 kHz, 30 kHz, or 60 kHz may be used with NCP, or ECP may be used for an SCS of 60 kHz. As for the TRS configuration for multicast, the TRS configuration may use a different numerology than used for unicast in the BWP. For example, the TRS configuration may configure the TRS to use an SCS of 15 kHz (FR1) and ECP. If the TRS is not configured, the UE 120 may use, as a default TRS configuration, the same numerology as used for unicast in the BWP.

The UE 120 may not be expected to receive the TRS outside of an initial downlink BWP (e.g., CORESET0 for idle or inactive UEs). Accordingly, the TRS configuration may configure the TRS bandwidth to be no larger than the CFR. Because the CFR may be the same size or larger than the CORESET0, the TRS may be configured differently for MB S than for power saving. The TRS configuration of a TRS for MB S may include frequency domain related parameters, such as startRB, nrofRB, or frequencyDomainAllocation.

In some aspects, the TRS configuration may configure time occasions for the TRS for MBS. The TRS configuration of the TRS for MBS may include time domain related parameters, such as periodicityAndOffset and firstOFDMSymbolInTimeDomain. The TRS may be transmitted only in the configured occasions when the GC-PDCCH or the GC-PDSCH is scheduled. That is, the TRS may be time division multiplexed or frequency division multiplexed with GC-PDCCH resource elements (REs) or GC-PDSCH REs using the same SCS and CP configuration in a slot.

In some aspects, the TRS configuration may configure the scrambling ID of the TRS in the CFR. The TRS scrambling ID may be considered a virtual cell ID corresponding to an MB SFN area. For example, if an MBSFN area has 10 cells, the virtual cell ID may be one value, and if another MB SFN area has 5 cells, the virtual cell ID may be another value. This means that the scrambling sequence initialization seed of the TRS may use the virtual cell ID corresponding to a particular MB SFN area, and the virtual cell ID may be different than the physical cell ID that is used for the TRS for power saving. In other words, the TRS scrambling ID may be configured specifically for MBS.

In some aspects, a TRS QCL source may be configured in the CFR for MBS. The GC-PDCCH or the GC-PDSCH for MBS may be configured to be QCLed with the TRS, and the TRS may be QCLed with the SSB (but with a restriction). For example, for MBS with single-cell transmission, the TRS may be QCLed with a serving cell's SSB in terms of QCL-Type C for timing and delay spread with the serving cell and QCL-Type D for spatial relation parameters if needed. In another example, for MBS with multi-cell SFN transmission, the TRS may be QCLed with a serving cell's SSB in terms of QCL-Type B for timing and possibly for Doppler and Doppler spread, but not QCL-Type A or QCL-Type C for delay spread or QCL-Type D for spatial relation parameters with the serving cell. This is because the TRS may be transmitted from different cells, not just the serving cell, and thus the delay spread and beam direction may be different. For FR2, the GC-PDCCH or the GC-PDSCH for MBS may be configured to be QCLed with the TRS, and the TRS may be QCLed with all the SSBs of the cells joining the SFN transmission in terms of QCL-Type C and QCL-Type D.

The GC-PDCCH and the GC-PDSCH for MBS may have different QCL sources. For example, the GC-PDCCH transmitted from the serving cell may be QCLed with the TRS or not QCLed with the TRS. The TRS, if configured, may be QCLed with the serving cell SSB, but the GC-PDSCH transmitted from multiple cells may be QCLed with another TRS that is used for SFN-based multi-cell transmission. The TRS may not be limited to having the same transmission configuration indicator (TCI) state as its availability indication (e.g., in the GC-PDCCH). After receiving a TRS availability indication, the UE 120 may switch TCI states to monitor for the TRS with the associated QCL source.

In some aspects, the TRS configuration may configure the TRS for power boosting in the CFR. The TRS configuration may include a power offset parameter of an NZP CSI-RS RE that is relative to an SSS RE, such as powerControlOffsetSS, for the MBS TRS. The power SSS of multiple cells in the MBSFN area may need to be aligned (with an indication of the serving cell SSS RE power offset). That is, the network may align the power SSS of the multiple cells in the MBSFN and indicate a power offset of the TRS relative to the SSS REs in the CFR, such that the UEs in the multiple cells may understand the use of the power offset for MBS. By default, the power offset parameters of the TRS for MBS may be the same as the power offset parameters of the TRS used for power saving (or defined as 0 dB relative to the SSB of the serving cell).

In some aspects, Layer 1 (L1)-based signaling may be used to indicate the availability of a TRS for MBS at a configured time occasion of a periodic TRS. For example, the availability indication may be included in the GC-PDCCH used for the MCCH or the MTCH or in a paging early indication (PEI) for MBS. This may be in contrast to the paging DCI used for power saving. A DCI format 1_1 or DCI format 1_0 may be used to indicate the TRS availability. For example, a first DCI format for MBS using DCI format 1_0 may be used as a baseline with a limited field and may only indicate a 1-bit TRS availability. A second DCI format (with a larger size than the first DCI format) for MBS using DCI format 1_1 (as a baseline) may include a bitmap or a codepoint that indicates at least one resource or configuration, or a group of resources for TRS transmission. The DCI format 1_1 may involve more fields for flexibility with idle or inactive UEs. If an L1-based availability indication is not configured, an availability indication may be included directly in an SIB or an MCCH message.

Before the UE 120 receives the availability indication, the UE 120 may expect that the TRS for MBS is not transmitted (i.e., no blind detection). After the UE 120 receives the indication, the UE 120 may expect that the TRS is valid for a time duration starting from a reference point that is configured for MBS and separate from (or independent of) any reference point configured for power saving.

The time duration may be determined based at least in part on one of various ways. For example, the time duration may be configured by a higher layer (in the CFR as part of the TRS configuration for MBS). The time duration for MBS may be a predefined or configured window specific to MBS. If the time duration is not configured for the TRS for MBS, the time duration may match that used for the TRS used for power saving or another specified default value. The time duration may be indicated in a GC-PDCCH, where several candidate values may be used and the L1 signaling may indicate which candidate value is to be used. The time duration may also last until another availability indication is received. The time duration may also involve a combination of the various ways discussed above.

In some aspects, the reference point for the time duration may be determined in one or a combination of several ways, which may be different than a time duration used for paging. For example, the reference point may include a start of a next discontinuous reception (DRX) cycle for MBS (relative to the L1-based availability indication), which may be separate from (possibly different than) a DRX cycle specified for power saving. For example, the slot in which the L1-based availability indication is received in the GC-PDCCH may be the reference point. The reference point may include a time location where the UE 120 receives the availability indication (application delay may be needed when the TRS becomes unavailable). The reference point may also include a start of the current DRX cycle for MBS, where the UE 120 receives the indication. The reference point may also include a time location explicitly configured by a higher layer for MBS. If no reference point is indicated or otherwise configured, the reference point may be the same as that used for power saving, as a default.

As shown by reference number 415, the base station 110 may transmit the TRS. As shown by reference number 420, the UE 120 may update a tracking loop based at least in part on the TRS. When the UE 120 enters a connected state, as shown by reference number 425, the UE 120 may be better prepared to receive an MBS communication. As shown by reference number 430, the base station 110 may transmit an MBS communication. The UE 120 may receive the MBS communication according to a timing that is based at least in part on the tracking loop. The UE 120 may also transmit an MBS communication with a timing that is based at least in part on the tracking loop. By configuring a TRS specifically for MBS and transmitting the TRS configuration in the CFR used for MBS, the UE 120 may more quickly and accurately act on MBS communications upon entering a connected state. As a result, the UE 120 reduces latency and causes the UE 120 and the base station 110 to conserve processing resources and signaling resources.

As indicated above, FIG. 4 is provided as an example. Other examples may differ from what is described with respect to FIG. 4.

Figure 5:
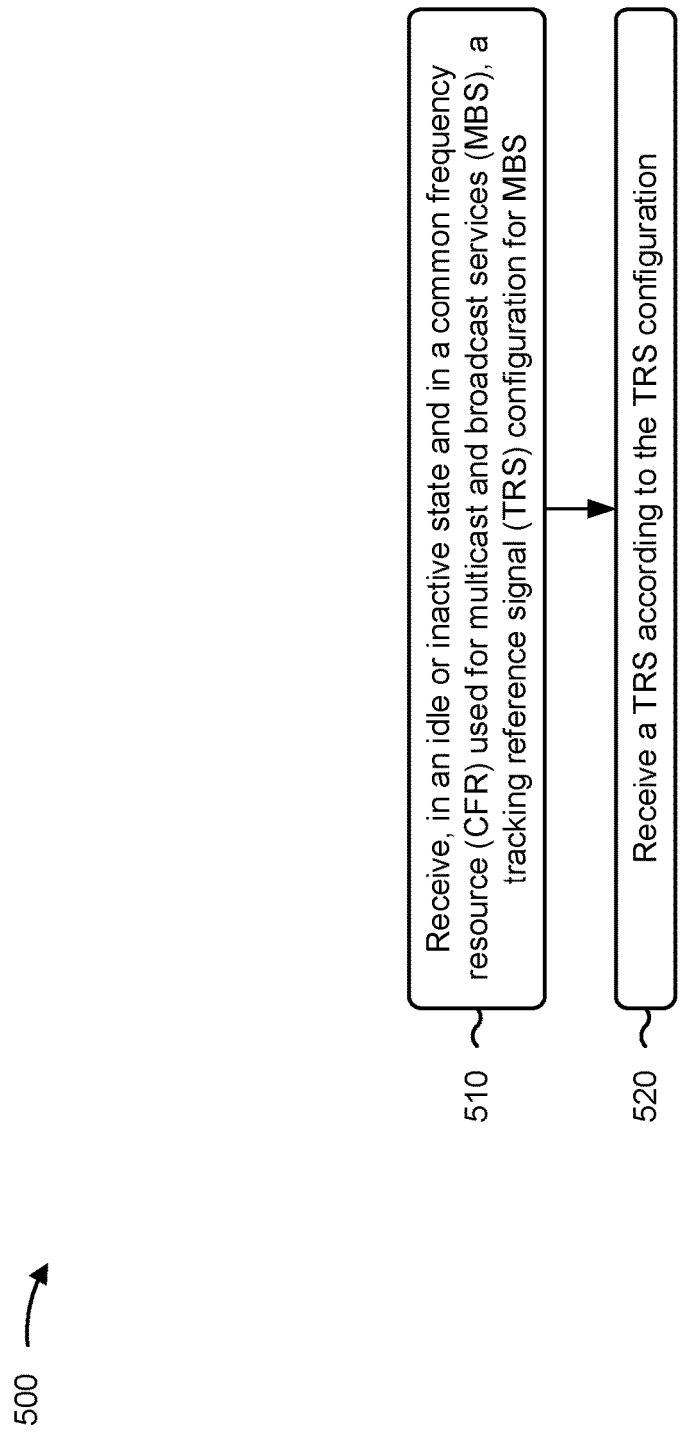
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with receiving a TRS for MBS in a CFR used for MBS.

As shown in FIG. 5, in some aspects, process 500 may include receiving, in an idle or inactive state and in a CFR used for MBS, a TRS configuration for MBS (block 510). For example, the UE (e.g., using communication manager 140 and/or reception component 702 depicted in FIG. 7) may receive, in an idle or inactive state and in a CFR used for MBS, a TRS configuration for MBS, as described above.

As further shown in FIG. 5, in some aspects, process 500 may include receiving a TRS according to the TRS configuration (block 520). For example, the UE (e.g., using communication manager 140 and/or reception component 702 depicted in FIG. 7) may receive a TRS according to the TRS configuration, as described above.

Process 500 may include additional aspects, such as any single aspect or any combination of aspects described below and/or in connection with one or more other processes described elsewhere herein.

In a first aspect, the TRS configuration is separate from (possibly different than) a power saving TRS configuration for configuring power saving parameters for a UE in an idle or inactive state.

In a second aspect, alone or in combination with the first aspect, the TRS configuration configures the TRS separately for multicast and for broadcast. The TRS configuration may configure the TRS for multicast differently than the TRS for broadcast.

In a third aspect, alone or in combination with one or more of the first and second aspects, the TRS configuration configures the TRS separately for an MCCH and for an MTCH. The TRS configuration may configure the TRS for MCCH differently than the TRS for MTCH.

In a fourth aspect, alone or in combination with one or more of the first through third aspects, the TRS configuration configures a periodicity of the TRS for the MCCH based at least in part on a modulation level of a GC-PDSCH for the MCCH and/or configures a periodicity of the TRS for the MTCH based at least in part on a modulation level of a GC-PDSCH for the MTCH.

In a fifth aspect, alone or in combination with one or more of the first through fourth aspects, receiving the TRS configuration for the TRS for the MCCH includes receiving the TRS configuration in an SIB.

In a sixth aspect, alone or in combination with one or more of the first through fifth aspects, receiving the TRS configuration for the TRS for the MTCH includes receiving the TRS configuration in an MCCH message.

In a seventh aspect, alone or in combination with one or more of the first through sixth aspects, the TRS configuration configures the TRS separately for a GC-PDCCH and for a GC-PDSCH. The TRS configuration may configure the TRS separately for a GC-PDCCH than for a GC-PDSCH.

In an eighth aspect, alone or in combination with one or more of the first through seventh aspects, the GC-PDCCH uses single-cell transmission, and an SCS and CP configuration for the TRS and an SCS and CP configuration for the GC-PDCCH are the same.

In a ninth aspect, alone or in combination with one or more of the first through eighth aspects, the GC-PDSCH uses multi-cell SFN transmission, where an SCS and CP configuration for the TRS and an SCS and CP configuration for the GC-PDSCH are the same, and the SCS and CP configuration for the TRS and the SCS and CP configuration for the GC-PDCCH are different.

In a tenth aspect, alone or in combination with one or more of the first through ninth aspects, the CFR is associated with one or more G-RNTIs, and the TRS configuration configures one or more parameters for the TRS per RNTI.

In an eleventh aspect, alone or in combination with one or more of the first through tenth aspects, the TRS corresponds to a specific RNTI.

In a twelfth aspect, alone or in combination with one or more of the first through eleventh aspects, the CFR is associated with one or more SCS and CP configurations, and the TRS configuration configures one or more parameters for the TRS per SCS and CP configuration.

In a thirteenth aspect, alone or in combination with one or more of the first through twelfth aspects, the TRS configuration includes an SCS and CP configuration for broadcast that is different than an SCS and CP configuration for CORESET0.

In a fourteenth aspect, alone or in combination with one or more of the first through thirteenth aspects, the TRS configuration includes an SCS and CP configuration for multicast that is different than an SCS and CP configuration for unicast for a BWP.

In a fifteenth aspect, alone or in combination with one or more of the first through fourteenth aspects, the TRS configuration specifies that a size of a frequency bandwidth of the TRS is no greater than a size of the CFR.

In a sixteenth aspect, alone or in combination with one or more of the first through fifteenth aspects, the TRS configuration specifies frequency domain parameters for the TRS.

In a seventeenth aspect, alone or in combination with one or more of the first through sixteenth aspects, the TRS configuration specifies that the TRS is to be received in time occasions for which a GC-PDCCH communication is scheduled or for which a GC-PDSCH communication is scheduled.

In an eighteenth aspect, alone or in combination with one or more of the first through seventeenth aspects, the TRS configuration includes a TRS scrambling identifier that is configured in the CFR specifically for MBS.

In a nineteenth aspect, alone or in combination with one or more of the first through eighteenth aspects, the TRS configuration specifies that the TRS for MBS is quasi-co-located with a GC-PDCCH communication, a GC-PDSCH communication, or an SSB.

In a twentieth aspect, alone or in combination with one or more of the first through nineteenth aspects, the TRS configuration specifies that the TRS for MBS has a QCL source for a GC-PDCCH that is different than a QCL source for a GC-PDSCH.

In a twenty-first aspect, alone or in combination with one or more of the first through twentieth aspects, the TRS configuration includes a power offset parameter that is specific to MBS and that is defined relative to a power offset for an SSS.

In a twenty-second aspect, alone or in combination with one or more of the first through twenty-first aspects, process 500 includes receiving an indication of an availability of the TRS for MBS at one or more configured time occasions, where the indication is included in an SIB, an MCCH communication, DCI for MBS in a GC-PDCCH communication, or a PEI specific to MBS, and receiving the TRS includes monitoring for the TRS in the one or more configured time occasions.

In a twenty-third aspect, alone or in combination with one or more of the first through twenty-second aspects, the TRS is valid for a time duration after a reference point configured for MBS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
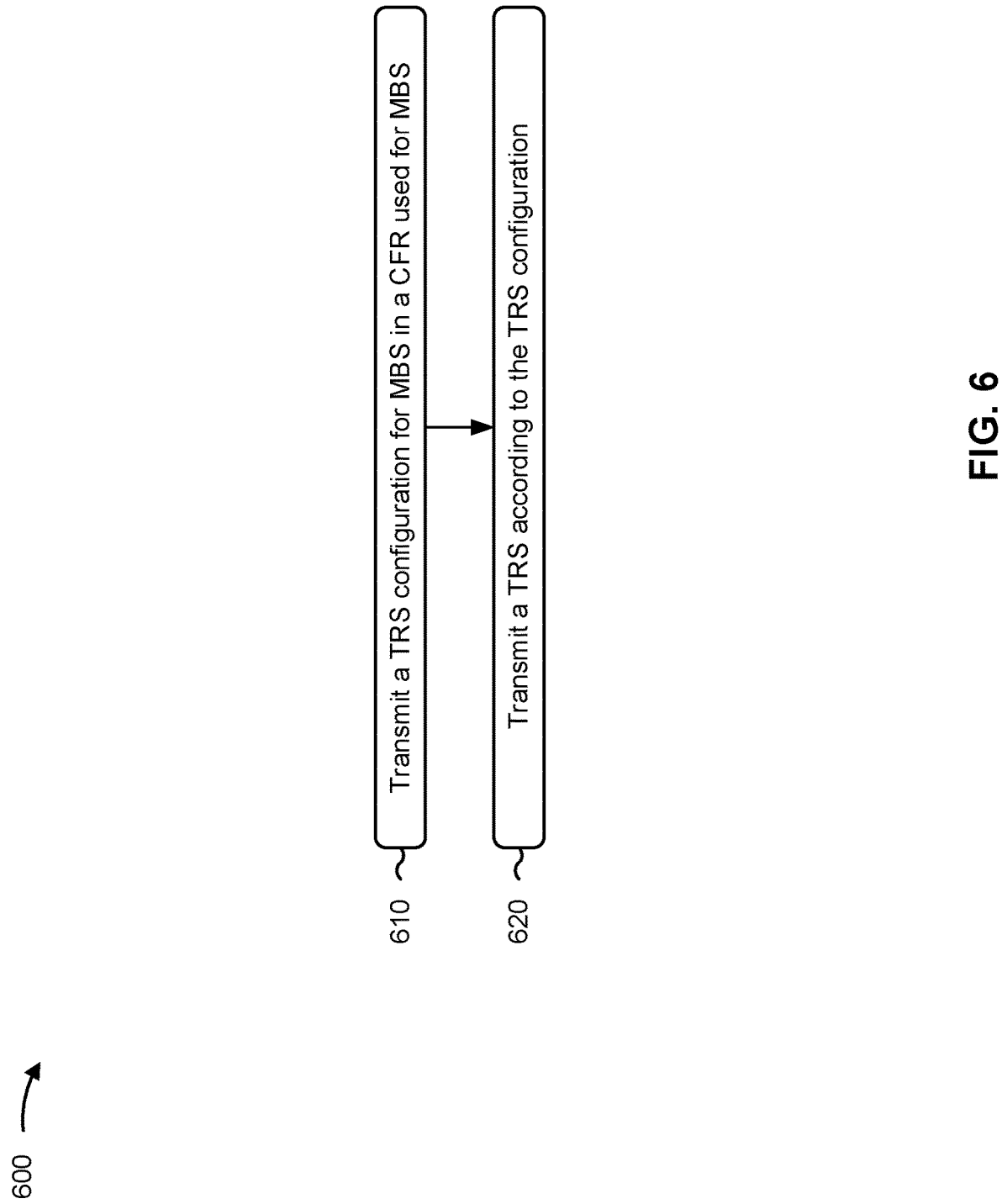
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110) performs operations associated with transmitting a TRS for MBS in a CFR for MBS.

As shown in FIG. 6, in some aspects, process 600 may include transmitting a TRS configuration for MBS in a CFR used for MBS (block 610). For example, the base station (e.g., using communication manager 150 and/or transmission component 804 depicted in FIG. 8) may transmit a TRS configuration for MBS in a CFR used for MBS, as described above.

As further shown in FIG. 6, in some aspects, process 600 may include transmitting a TRS according to the TRS configuration (block 620). For example, the base station (e.g., using communication manager 150 and/or transmission component 804 depicted in FIG. 8) may transmit a TRS according to the TRS configuration, as described above.

Process 600 may include additional aspects, such as any single aspect or any combination of aspects described below and/or in connection with one or more other processes described elsewhere herein.

In a first aspect, the TRS configuration configures the TRS separately for multicast and for broadcast. The TRS configuration may configure the TRS for multicast differently than the TRS for broadcast.

In a second aspect, alone or in combination with the first aspect, the TRS configuration configures the TRS separately for an MCCH and for an MTCH. The TRS configuration may configure the TRS for MCCH differently than the TRS for MTCH.

In a third aspect, alone or in combination with one or more of the first and second aspects, transmitting the TRS configuration for the TRS for the MCCH includes transmitting the TRS configuration in an SIB.

In a fourth aspect, alone or in combination with one or more of the first through third aspects, transmitting the TRS configuration for the TRS for the MTCH includes transmitting the TRS configuration in an MCCH message.

In a fifth aspect, alone or in combination with one or more of the first through fourth aspects, the TRS configuration configures the TRS separately for a GC-PDCCH and a GC-PDSCH. The TRS configuration may configure the TRS separately for a GC-PDCCH than for a GC-PDSCH.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
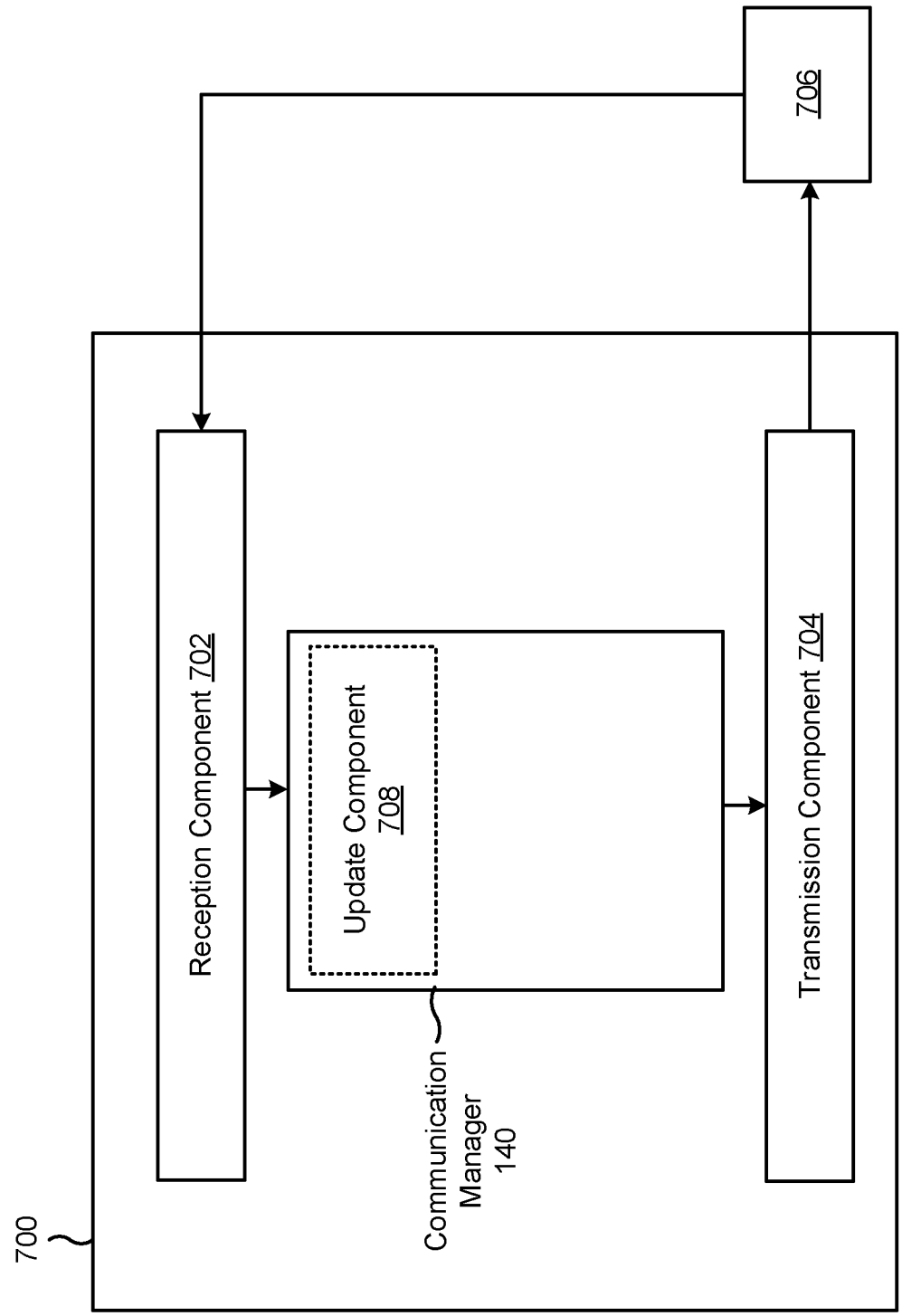
FIGS. 7-8 are diagrams of example apparatuses for wireless communication, in accordance with the present disclosure.

FIG. 7 is a diagram of an example apparatus 700 for wireless communication. The apparatus 700 may be a UE (e.g., UE 120), or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include an update component 708, among other examples.

In some aspects, the apparatus 700 may be configured to perform one or more operations described herein in connection with FIGS. 1-4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, in an idle or inactive state and in a CFR used for MBS, a TRS configuration for MBS. The reception component 702 may receive a TRS according to the TRS configuration. The update component 708 may update a tracking loop of the apparatus 700 based at least in part on the TRS for MBS.

The reception component 702 may receive an indication of an availability of the TRS for MBS at one or more configured time occasions, where the indication is included in a SIB, an MCCH communication, DCI for MBS in a GC-PDCCH, or a PEI that is specific to MBS. The reception component 702 may receive the TRS by monitoring for the TRS in the one or more configured time occasions.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
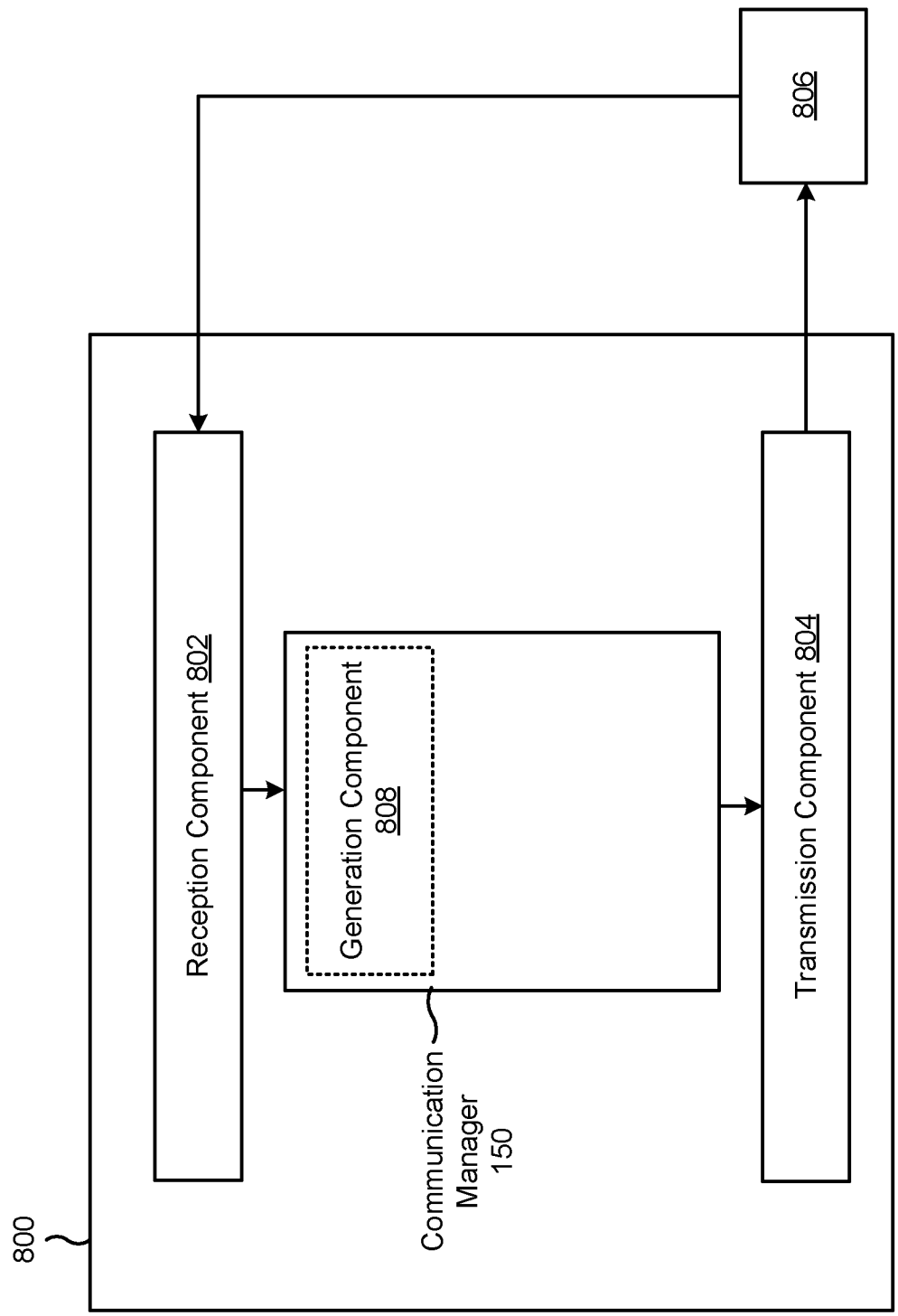

FIG. 8 is a diagram of an example apparatus 800 for wireless communication. The apparatus 800 may be a base station (base station 110), or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a generation component 808, among other examples.

In some aspects, the apparatus 800 may be configured to perform one or more operations described herein in connection with FIGS. 1-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The generation component 808 may generate a TRS configuration for MBS. The transmission component 804 may transmit the TRS configuration for MBS in a CFR that is configured for MBS. The transmission component 804 may transmit a TRS according to the TRS configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, in an idle or inactive state and in a common frequency resource (CFR) used for multicast and broadcast services (MBS), a tracking reference signal (TRS) configuration for MBS; and receiving a TRS according to the TRS configuration.

Aspect 2: The method of Aspect 1, wherein the TRS configuration is different from a power saving TRS configuration for configuring power saving parameters for a UE in an idle or inactive state.

Aspect 3: The method of Aspect 1 or 2, wherein the TRS configuration configures the TRS differently for multicast than for broadcast.

Aspect 4: The method of any of Aspects 1-3, wherein the TRS configuration configures the TRS differently for a multicast control channel (MCCH) than for a multicast traffic channel (MTCH).

Aspect 5: The method of Aspect 4, wherein the TRS configuration configures a periodicity of the TRS for the MCCH based at least in part on a modulation level of a group-common physical downlink shared channel (GC-PDSCH) for the MCCH.

Aspect 6: The method of Aspect 4, wherein the TRS configuration configures a periodicity of the TRS for the MTCH based at least in part on a modulation level of a group-common physical downlink shared channel (GC-PDSCH) for the MTCH.

Aspect 7: The method of Aspect 4, wherein receiving the TRS configuration for the TRS for the MCCH includes receiving the TRS configuration in a system information block.

Aspect 8: The method of Aspect 4, wherein receiving the TRS configuration for the TRS for the MTCH includes receiving the TRS configuration in an MCCH message.

Aspect 9: The method of any of Aspects 1-8, wherein the TRS configuration configures the TRS differently for a group common physical downlink control channel (GC-PDCCH) than for a group common physical downlink shared channel (GC-PDSCH).

Aspect 10: The method of Aspect 9, wherein the GC-PDCCH uses single-cell transmission, and wherein a subcarrier spacing (SCS) and cyclic prefix (CP) configuration for the TRS and an SCS and CP configuration for the GC-PDCCH are the same.

Aspect 11: The method of Aspect 9, wherein the GC-PDSCH uses multi-cell single frequency network (SFN) transmission, wherein a subcarrier spacing (SCS) and cyclic prefix (CP) configuration for the TRS and an SCS and CP configuration for the GC-PDSCH are the same, and wherein the SCS and CP configuration for the TRS and the SCS and CP configuration for the GC-PDCCH are different.

Aspect 12: The method of any of Aspects 1-11, wherein the CFR is associated with one or more group radio network temporary identifiers (G-RNTIs), and wherein the TRS configuration configures one or more parameters for the TRS per RNTI.

Aspect 13: The method of Aspect 12, wherein the TRS corresponds to a specific RNTI.

Aspect 14: The method of any of Aspects 1-13, wherein the CFR is associated with one or more subcarrier spacing (SCS) and cyclic prefix (CP) configurations, and wherein the TRS configuration configures one or more parameters for the TRS per SCS and CP configuration.

Aspect 15: The method of any of Aspects 1-14, wherein the TRS configuration includes a subcarrier spacing (SCS) and cyclic prefix (CP) configuration for broadcast that is different than an SCS and CP configuration for control resource set zero (CORESET0).

Aspect 16: The method of any of Aspects 1-15, wherein the TRS configuration includes a subcarrier spacing (SCS) and cyclic prefix (CP) configuration for multicast that is different than an SCS and CP configuration for unicast for a bandwidth part (BWP).

Aspect 17: The method of any of Aspects 1-16, wherein the TRS configuration specifies that a size of a frequency bandwidth of the TRS is no greater than a size of the CFR.

Aspect 18: The method of any of Aspects 1-17, wherein the TRS configuration specifies frequency domain parameters for the TRS.

Aspect 19: The method of Aspect 18, wherein the TRS configuration specifies that the TRS is to be received in time occasions for which a group common physical downlink control channel (GC-PDCCH) communication is scheduled or for which a group common physical downlink shared channel (GC-PDSCH) communication is scheduled.

Aspect 20: The method of any of Aspects 1-19, wherein the TRS configuration includes a TRS scrambling identifier that is configured in the CFR specifically for MBS.

Aspect 21: The method of any of Aspects 1-20, wherein the TRS configuration specifies that the TRS for MBS is quasi-co-located with a group common physical downlink control channel (GC-PDCCH) communication, a group common physical downlink shared channel (GC-PDSCH) communication, or a synchronization signal block.

Aspect 22: The method of any of Aspects 1-21, wherein the TRS configuration specifies that the TRS for MBS has a quasi-co-location (QCL) source for a group common physical downlink control channel (GC-PDCCH) that is different than a QCL source for a group common physical downlink shared channel (GC-PDSCH).

Aspect 23: The method of any of Aspects 1-22, wherein the TRS configuration includes a power offset parameter that is specific to MBS and that is defined relative to a power offset for a secondary synchronization signal.

Aspect 24: The method of any of Aspects 1-23, further comprising receiving an indication of an availability of the TRS for MBS at one or more configured time occasions, wherein the indication is included in a system information block (SIB), a multicast control channel (MCCH) communication, downlink control information for MBS in a group common physical downlink control channel communication, or a paging early indication (PEI) specific to MBS, and wherein receiving the TRS includes monitoring for the TRS in the one or more configured time occasions.

Aspect 25: The method of any of Aspects 1-24, wherein the TRS is valid for a time duration after a reference point configured for MBS.

Aspect 26: A method of wireless communication performed by a base station, comprising: transmitting a tracking reference signal (TRS) configuration for multicast and broadcast services (MBS) in a common frequency resource (CFR) used for MBS; and transmitting a TRS according to the TRS configuration.

Aspect 27: The method of Aspect 26, wherein the TRS configuration configures the TRS differently for multicast than for broadcast.

Aspect 28: The method of Aspect 26 or 27, wherein the TRS configuration configures the TRS differently for a multicast control channel (MCCH) than for a multicast traffic channel (MTCH).

Aspect 29: The method of Aspect 28, wherein transmitting the TRS configuration for the TRS for the MCCH includes transmitting the TRS configuration in a system information block.

Aspect 30: The method of Aspect 28, wherein transmitting the TRS configuration for the TRS for the MTCH includes transmitting the TRS configuration in an MCCH message.

Aspect 31: The method of Aspect 26, wherein the TRS configuration configures the TRS differently for a group common physical downlink control channel (GC-PDCCH) than for a group common physical downlink shared channel (GC-PDSCH).

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, in an idle or inactive state and in a common frequency resource (CFR) used for multicast and broadcast services (MBS), a tracking reference signal (TRS) configuration for MBS; and
receive a TRS according to the TRS configuration,
wherein the TRS configuration configures the TRS differently for multicast than for broadcast,
wherein the TRS configuration configures the TRS differently for a group common physical downlink control channel (GC-PDCCH) than for a group common physical downlink shared channel (GC-PDSCH), and
wherein at least one of:
the GC-PDCCH is configured for transmission using single-cell transmission, and a subcarrier spacing (SCS) and cyclic prefix (CP) configuration for the TRS and an SCS and CP configuration for the GC-PDCCH are the same, or
the GC-PDSCH is configured for transmission using multi-cell single frequency network (SFN) transmission, an SCS and CP configuration for the TRS and an SCS and CP configuration for the GC-PDSCH are the same, and the SCS and CP configuration for the TRS and the SCS and CP configuration for the GC-PDCCH are different.

2. The UE of claim 1, wherein the TRS configuration is different from a power saving TRS configuration for configuring power saving parameters for a UE in an idle or inactive state.

3. The UE of claim 1, wherein the TRS configuration configures the TRS differently for a multicast control channel (MCCH) than for a multicast traffic channel (MTCH).

4. The UE of claim 3, wherein the TRS configuration configures a periodicity of the TRS for the MCCH based at least in part on a modulation level of the GC-PDSCH for MCCH or the MTCH.

5. The UE of claim 3, wherein the TRS configuration configures a periodicity of the TRS for the MTCH based at least in part on a modulation level of the GC-PDSCH for the MTCH.

6. The UE of claim 3, wherein the one or more processors, to receive the TRS configuration for the TRS for the MCCH, are configured to receive the TRS configuration in a system information block.

7. The UE of claim 3, wherein the one or more processors, to receive the TRS configuration for the TRS for the MTCH, are configured to receive the TRS configuration in an MCCH message.

8. The UE of claim 1, wherein the CFR is associated with one or more group radio network temporary identifiers (G-RNTIs), and wherein the TRS configuration configures one or more parameters for the TRS per RNTI.

9. The UE of claim 8, wherein the TRS corresponds to a specific RNTI.

10. The UE of claim 1, wherein the CFR is associated with one or more SCS and CP configurations, and wherein the TRS configuration configures one or more parameters for the TRS per SCS and CP configuration.

11. The UE of claim 1, wherein the TRS configuration includes an SCS and CP configuration for broadcast that is different than an SCS and CP configuration for control resource set zero (CORESET0).

12. The UE of claim 1, wherein, for a bandwidth part (BWP) the TRS configuration includes an SCS and CP configuration for a control channel that is different than an SCS and CP configuration for a data channel.

13. The UE of claim 1, wherein the TRS configuration specifies that a size of a frequency bandwidth of the TRS is no greater than a size of the CFR or specifies frequency domain parameters for the TRS.

14. The UE of claim 13, wherein the TRS configuration specifies that the TRS is to be received in time occasions for which a GC-PDCCH communication is scheduled or for which a GC-PDSCH communication is scheduled.

15. The UE of claim 1, wherein the TRS configuration includes a TRS scrambling identifier that is configured in the CFR specifically for MBS.

16. The UE of claim 1, wherein the TRS configuration specifies that the TRS for MBS is quasi-co-located with a GC-PDCCH communication, a GC-PDSCH communication, or a synchronization signal block.

17. The UE of claim 1, wherein the TRS configuration specifies that the TRS for MBS has a quasi-co-location (QCL) source for the GC-PDCCH that is different than a QCL source for the GC-PDSCH.

18. The UE of claim 1, wherein the TRS configuration includes a power offset parameter that is specific to MBS and that is defined relative to a power offset for a secondary synchronization signal.

19. The UE of claim 1, wherein the one or more processors are configured to receive an indication of an availability of the TRS for MBS at one or more configured time occasions, wherein the indication is included in a system information block (SIB), a multicast control channel (MCCH) communication, downlink control information for MBS in a group common physical downlink control channel communication, or a paging early indication (PEI) specific to MBS, and wherein the one or more processors, to receive the TRS, are configured to monitor for the TRS in the one or more configured time occasions.

20. The UE of claim 1, wherein the TRS is valid for a time duration after a reference point configured for MBS.

21. A base station for wireless communication, comprising:
a memory; and
one or more processors, coupled to the memory, configured to:
transmit a tracking reference signal (TRS) configuration for multicast and broadcast services (MBS) in a common frequency resource (CFR) used for MBS; and
transmit a TRS according to the TRS configuration,
wherein the TRS configuration configures the TRS differently for multicast than for broadcast,
wherein the TRS configuration configures the TRS differently for a group common physical downlink control channel (GC-PDCCH) than for a group common physical downlink shared channel (GC-PDSCH), and
wherein at least one of:
the GC-PDCCH is configured for transmission using single-cell transmission, and a subcarrier spacing (SCS) and cyclic prefix (CP) configuration for the TRS and an SCS and CP configuration for the GC-PDCCH are the same, or
the GC-PDSCH is configured for transmission using multi-cell single frequency network (SFN) transmission, an SCS and CP configuration for the TRS and an SCS and CP configuration for the GC-PDSCH are the same, and the SCS and CP configuration for the TRS and the SCS and CP configuration for the GC-PDCCH are different.

22. The base station of claim 21, wherein the TRS configuration configures the TRS differently for a multicast control channel (MCCH) than for a multicast traffic channel (MTCH).

23. The base station of claim 22, wherein the one or more processors, to transmit the TRS configuration for the TRS for the MCCH, are configured to transmit the TRS configuration in a system information block.

24. The base station of claim 22, wherein the one or more processors, to transmit the TRS configuration for the TRS for the MTCH, are configured to transmit the TRS configuration in an MCCH message.

25. The base station of claim 22, wherein the TRS configuration configures a periodicity of the TRS for the MCCH based at least in part on a modulation level of the GC-PDSCH for MCCH or the MTCH.

26. The base station of claim 22, wherein the TRS configuration configures a periodicity of the TRS for the MTCH based at least in part on a modulation level of the GC-PDSCH for the MTCH.

27. The base station of claim 22, wherein the one or more processors, to transmit the TRS configuration for the TRS for the MCCH, are configured to receive the TRS configuration in a system information block.

28. The base station of claim 22, wherein the one or more processors, to transmit the TRS configuration for the TRS for the MTCH, are configured to receive the TRS configuration in an MCCH message.

29. The base station of claim 21, wherein the CFR is associated with one or more group radio network temporary identifiers (G-RNTIs), and wherein the TRS configuration configures one or more parameters for the TRS per RNTI.

30. The base station of claim 21, wherein the TRS configuration includes a TRS scrambling identifier that is configured in the CFR specifically for MBS.

* * * * *